(12) United States Patent
Kashiwagi et al.

(10) Patent No.: US 8,699,163 B2
(45) Date of Patent: Apr. 15, 2014

(54) MAGNETIC DISK DRIVE AND DATA BUFFERING METHOD APPLIED TO THE SAME

(75) Inventors: Kazuto Kashiwagi, Ome (JP); Takayuki Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 77 days.

(21) Appl. No.: 13/551,343

(22) Filed: Jul. 17, 2012

(65) Prior Publication Data

US 2013/0182348 A1    Jul. 18, 2013

(30) Foreign Application Priority Data

Jan. 13, 2012  (JP) ................................ 2012-005265

(51) Int. Cl.
*G11B 5/09*    (2006.01)
(52) U.S. Cl.
USPC ............................................................ 360/50
(58) Field of Classification Search
CPC ........... G11B 2220/90; G11B 20/1403; G11B 21/083; G06F 3/0601; G06F 3/0676
USPC .......... 360/50, 51, 54, 55, 7.04, 78.07, 78.04; 711/103, 105, 112, 113, 162; 369/53.3, 369/53.31, 53.32; 714/6
See application file for complete search history.

(56) References Cited

U.S. PATENT DOCUMENTS 7,904,640 B2 *  3/2011  Yano et al. ..................... 711/103

FOREIGN PATENT DOCUMENTS

JP            3640585        4/2005

* cited by examiner

*Primary Examiner* — Nabil Hindi
(74) *Attorney, Agent, or Firm* — Patterson & Sheridan LLP

(57) ABSTRACT

According to one embodiment, there is provided a method of temporarily storing data in a buffer. The method determines whether data written based on sequential writing is of a first type or a second type in data type. The method stores the written data in association with the determined data type in the buffer. The method further controls the buffer so that the data of the first type stored in the buffer may be held in the buffer for a length of time twice as long as time $T_1$ corresponding to one revolution of a disk and the data of the second type stored in the buffer may be held in the buffer for the time $T_1$.

14 Claims, 14 Drawing Sheets

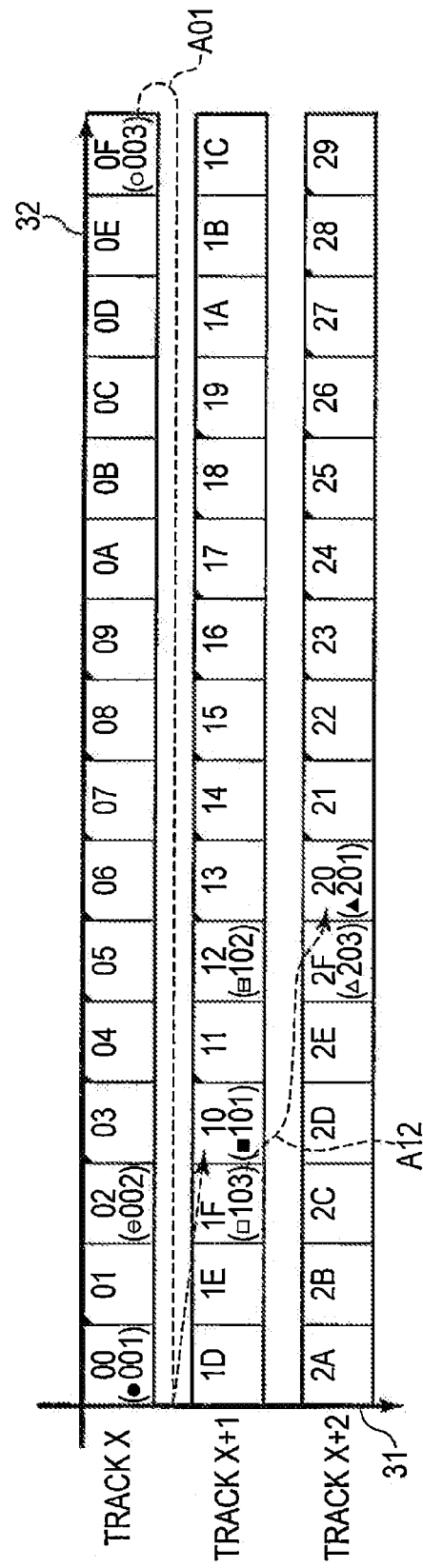
F I G. 3

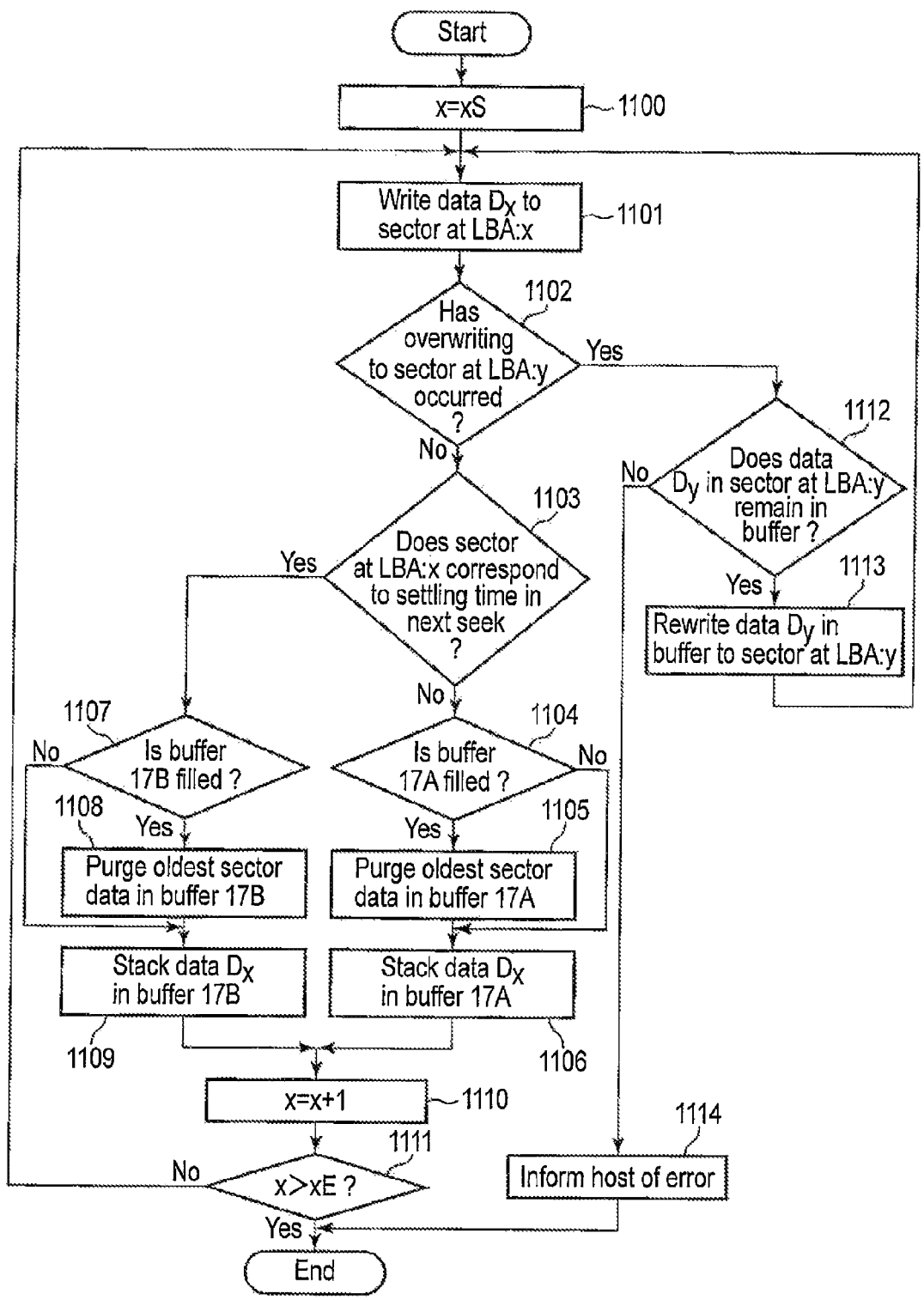
F I G. 11

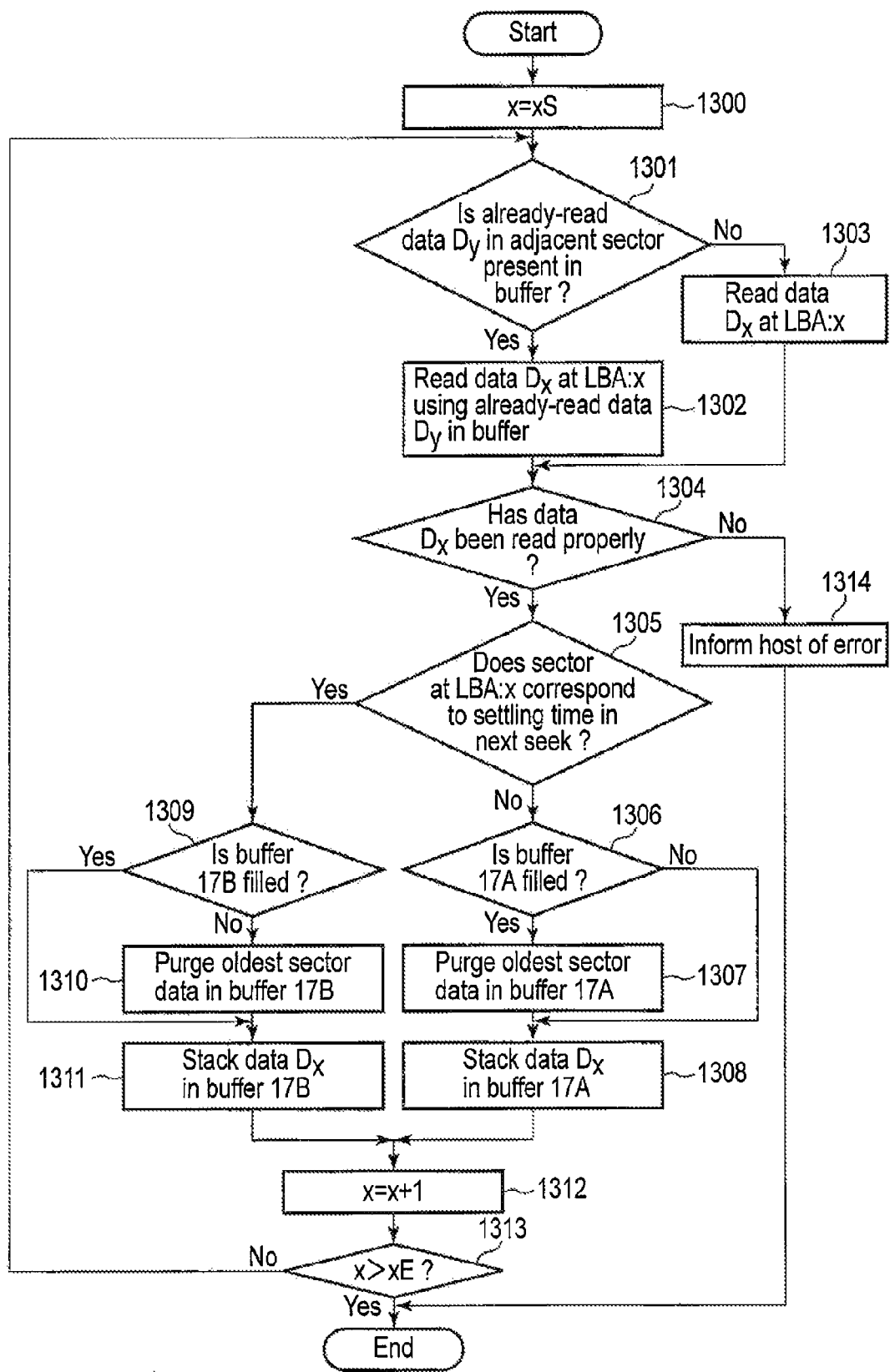
F I G. 13

MAGNETIC DISK DRIVE AND DATA BUFFERING METHOD APPLIED TO THE SAME

CROSS-REFERENCE TO RELATED APPLICATIONS

This application is based upon and claims the benefit of priority from prior Japanese Patent Application No. 2012-005265, filed Jan. 13, 2012, the entire contents of which are incorporated herein by reference.

FIELD

Embodiments described herein relate generally to a magnetic disk drive and a data buffering method applied to the magnetic disk drive.

BACKGROUND

In general, a magnetic disk drive uses a magnetic disk (that is, a disk-shaped magnetic storage medium) as a storage medium. In the magnetic disk drive, data is written concentrically on the magnetic disk by a magnetic head. In a recent magnetic disk drive, the track pitch is made narrower to increase the recording density. In such a magnetic disk drive, even when the head (magnetic head) deviates a little from the target position of the target track on the disk (magnetic disk), the head gets closer to the boundary between the target track (hereinafter, referred to as a first track) and an adjacent track (hereinafter, referred to as a second track). When the head is close to the track boundary, there is a possibility that the head will read data from not only the first track but also the second track simultaneously. This phenomenon is known as inter-track interference (ITI).

In the magnetic disk drive, sequential reading typified by, for example, shingled reading occurs frequently. In sequential reading, data is read sequentially from consecutive tracks on the disk. Suppose data is read from the second track, followed by the reading of data from the first track in the sequential reading.

In the conventional art, second data read from the second track (more specifically, second data which has suffered no inter-track interference or from which inter-track interference has been cancelled) is stored in a buffer. According to the conventional art, even if first data read from the first track has suffered inter-track interference, the inter-track interference has been cancelled based on the second data in the buffer.

As described above, in the conventional art, to cancel inter-track interference, data on a track read earlier in sequential reading is stored in the buffer.

However, when data read from all the tracks in sequential reading is stored in the buffer, this leads to an increase in the storage capacity of the buffer. Therefore, the storage capacity of the buffer (more specifically, the capacity of a memory used as the buffer) is required to decrease, while realizing the cancellation of the inter-track interference.

In addition, the displacement (e.g., an unexpected displacement) of the head causing inter-track interference occurs even in sequential writing typified by shingled writing. In such a case, data on an adjacent track is overwritten. At this time, if data immediately before it was overwritten (already-written data) has been stored in the buffer, the already-written data is rewritten to an area where overwriting has occurred, thereby enabling the area to be restored to the state immediately before the overwriting occurred. For this reason, the buffer is necessary to realize rewriting resulting from an unexpected displacement of the head in sequential writing. Therefore, in sequential reading, too, the storage capacity of the buffer is required to decrease.

BRIEF DESCRIPTION OF THE DRAWINGS

FIG. 3 is a schematic diagram to explain sequential writing in FIG. 2 in association with write positions on tracks and logical addresses;

FIG. 9A is a schematic diagram to explain the definition of data of a first type applied in the embodiment;

FIG. 9B is a schematic diagram to explain the definition of data of a first type and data of a second type applied in the embodiment;

FIG. 11 is a flowchart to explain an exemplary procedure for sequential writing applied in the embodiment;

FIG. 13 is a flowchart to explain an exemplary procedure for sequential reading applied in the embodiment.

DETAILED DESCRIPTION

In general, according to one embodiment, there is provided a method of temporarily storing, in a buffer, data written sequentially on a disk or data read sequentially from the disk in a magnetic disk drive. $I_1$ bits of data is written concentrically on the disk by a head in time $T_1$ per revolution or $I_1$ bits of data written concentrically on the disk is read by the head in the time $T_1$ per revolution. Settling time $T_2$ shorter than the time $T_1$ is needed from when the head is moved to an adjacent track until writing or reading by the head is started. The method determines whether first data or second data is of a first type or a second type in data type based on whether a first range of direction angle of a first area on a first track on the disk corresponds to a second range of direction angle through which the head moves in the settling time $T_2$ during a period from when the first data is written in the first area in the sequential writing or from when the second data is read from the first area in the sequential reading until the disk has rotated one revolution. The method stores the first data or the second data in association with the determined data type in the buffer. The method further controls the buffer so that the data of the first type stored in the buffer may be held in the buffer for a length of time twice as long as the time $T_1$ and the data of the second type stored in the buffer may be held in the buffer for the time $T_1$.

Figure 1:
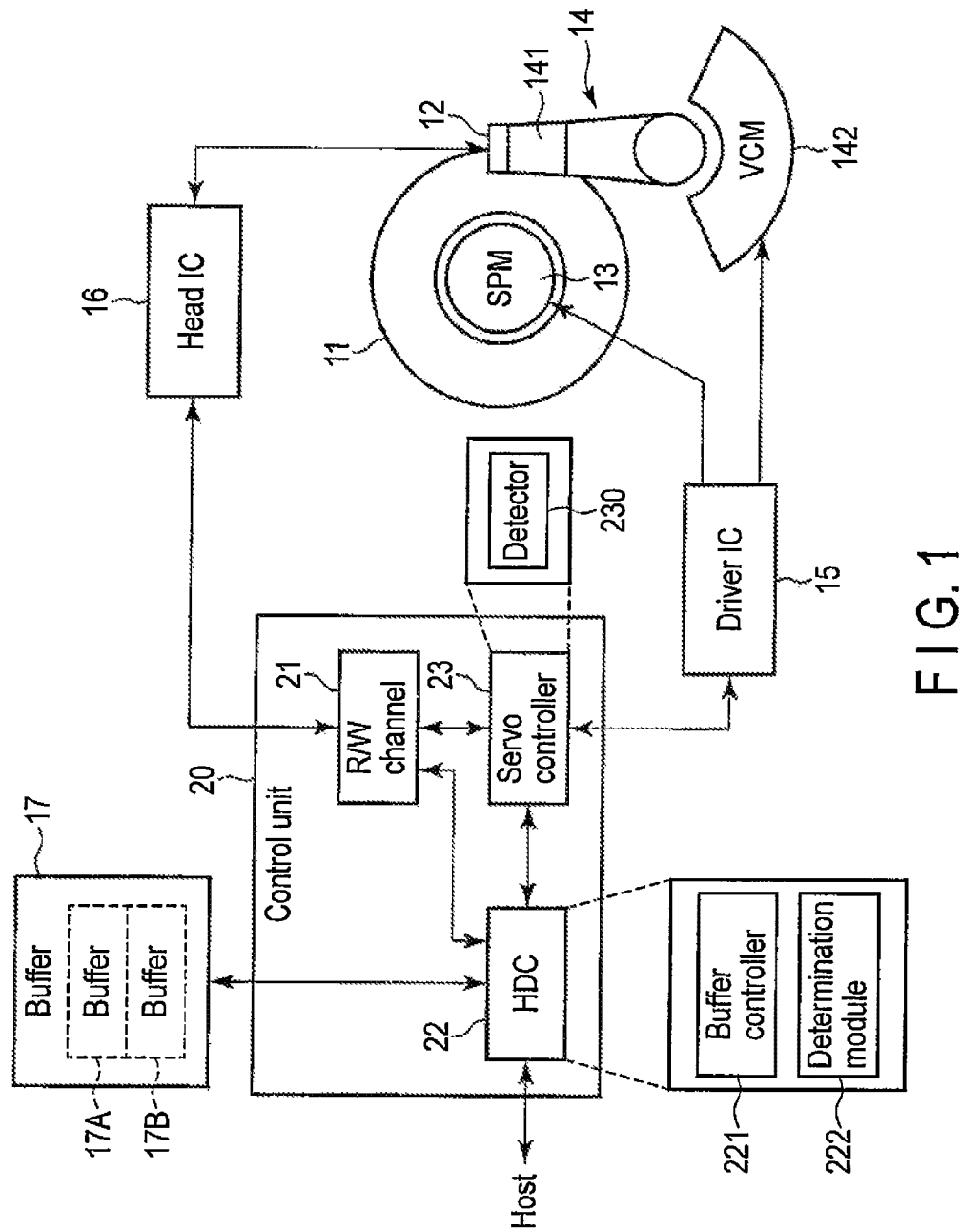
FIG. 1 is a block diagram showing an exemplary configuration of a magnetic disk drive according to an embodiment.

FIG. 1 is a block diagram showing an exemplary configuration of a magnetic disk drive according to an embodiment. A magnetic disk drive of FIG. 1 comprises a disk (magnetic disk) 11, a head (magnetic head) 12, a spindle motor (SPM) 13, an actuator 14, a driver IC 15, a head IC 16, a buffer 17, and a control unit 20.

The disk 11 is a magnetic recording medium. The disk 11 has two disk surfaces, the upper surface and the lower surface. For example, the upper surface of the disk 11 serves as a recording surface on which data is recorded magnetically. The recording surface (recording area) of the disk includes, for example, concentric tracks. Each of the tracks includes sectors. A unique physical address is allocated to each of the sectors. The sectors to which physical addresses are allocated include user sectors. A logical address (logical block address) LBA is allocated to each of the user sectors.

The head (head slider) 12 is arranged in association with the recording surface of the disk 11. The head 12 includes a write element and a read element (which are not shown). The head (more specifically, the write element and read element) is used to write data to the disk 11 and read data from the disk 11.

In the configuration of FIG. 1, use of a magnetic disk drive with a single disk 11 is assumed. However, a magnetic disk drive with a plurality of disks 11 stacked one on top of another may be used. Moreover, in the configuration of FIG. 1, one surface of the disk 11 serves as a recording surface. However, both surfaces of the disk 11 may serve as recording surfaces, with heads being arranged in association with both surfaces in a one-to-one correspondence.

The disk 11 is rotated at high speed by the SPM 13. The SPM 13 is driven by driving current (or driving voltage) supplied from the driver IC 15. The head (head slider) 12 is provided at the tip of an arm 141 of the actuator 14. The head 12 floats above the disk 11 as a result of the disk 11 rotating at high speed. The actuator 14 includes a voice coil motor (VCM) 142 functioning as a driving source of the actuator 14. When the actuator 14 is driven by the VCM 142, this causes the head 12 to move over the disk 11 in the radial direction of the disk 11 so as to draw an arc.

The driver IC 15 drives the SPM 13 and VCM 142 under the control of the control unit 30 (more specifically, a servo controller 23 described later in the control unit 20). The head IC 16, which is also called a head amplifier, amplifies a signal read by the head 12 (that is, a read signal). The head IC 16 further converts write data output from the control unit 20 (more specifically, an R/W channel 21 described later in the control unit 20) into a write current and outputs the current to the head 12.

The buffer 17 is used to temporarily store data written to the disk 11 and data read from the disk 11 under the control of the control unit 20 (more specifically, an HDC 22 described later in the control unit 20). In the embodiment, the buffer 17 is composed of two buffers, buffers 17A and 17B.

The control unit 20 is implemented by, for example, a system LSI with a plurality of elements integrated together on one chip and including a microprocessor unit (MPU). The control unit 20 comprises a read/write (R/W) channel 21, a disk controller (hereinafter, referred to as the HDC) 22, and a servo controller 23.

The R/W channel 21 processes signals related to read/write operations. Specifically, the R/W channel 21 converts a read signal amplified by the head IC 16 into digital data and decodes the digital data into read data. The R/W channel 21 further extracts servo data from the digital data. The R/W channel 21 further encodes write data transferred from the HDC 22 and transfers the encoded write data to the head IC 16.

The HDC 22 is connected to a host (host device) via a host interface. The host uses the magnetic disk drive of FIG. 1 as its own storage device. The host and the magnetic disk drive of FIG. 1 are provided in an electronic device, such as a personal computer, a video camera, a music player, a mobile terminal, a mobile phone, or a printer device.

The HDC 22 functions as a host interface controller that causes the HDC 22 to exchange signals with the host. Specifically, the HDC 22 receives commands (write commands, read commands, and others) transferred from the host. The HDC 22 further controls data transfer between the HDC 22 and the host. The HDC 22 further functions as a disk interface controller that controls the writing of data to the disk 11 and the reading of data from the disk 11 via the R/W channel 21, head IC 16, and head 12. The HDC 22 includes a buffer controller 221 and a determination module 222. The functions of the buffer controller 221 and determination module 222 will be described later.

The servo controller 23 controls the SPM 13 and VCM 142 via the driver IC 15. The servo controller 23 particularly controls the VCM 142 via the driver 15 to position the head 12 at a target position on a target track on the disk 11. The servo controller 23 includes a known detector 230 that detects the displacement (position error) of the head 12 from the target position on the target track.

Figure 2:
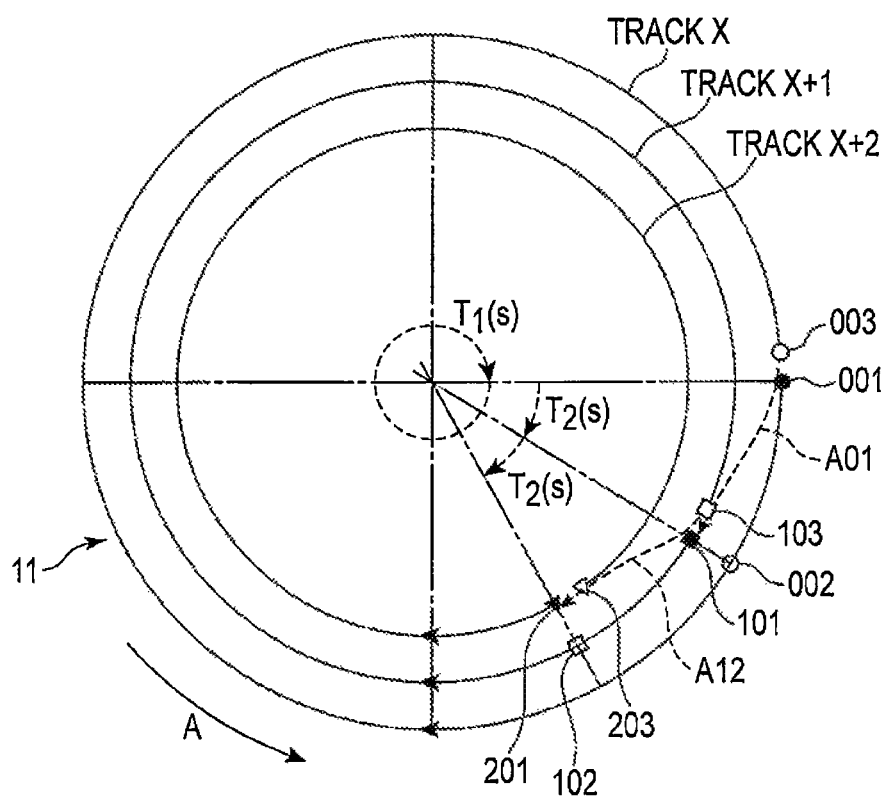
FIG. 2 shows an exemplary write start position and an exemplary write end position for each track in writing data sequentially on three tracks on the disk shown in FIG. 1.

Next, an example of the relationship between a disk format representing a track arrangement on the disk 11 applied in the embodiment and sequential writing will be explained with reference to FIG. 2. FIG. 2 shows an exemplary write start position and an exemplary write end position for each track in writing data sequentially to three tracks X, X+1, and X+2 on the disk 11. In FIG. 2, arrow A indicates a direction in which the disk rotates. In the embodiment, the time required for the disk 11 to rotate one revolution is $T_1$ [s].

In the example of FIG. 2, data is written sequentially in the order of track X, track X+1, and track X+2 (that is, in one radial direction of the disk 11). Suppose X, X+1, and X+2 indicate the track numbers (cylinder addresses) of track X, track X+1, and track X+2, respectively. In the sequential writing, settling time $T_2$ [s] for head movement and head positioning (that is, seek and positioning) is required each time a seek operation is performed to move the head 12 to the next track. Therefore, the relative positions (i.e., direction angles) on the circumference of the write start positions on tracks, X, X+1, and X+2 are not the same and slip little by little by $T_2/T_1$ [revolution] relative to the next. $T_1$ [s] and $T_2$ [s] satisfy the expression $0<T_2<T_1$. That is, $T_2$ [s] is greater than zero and less than $T_1$ [s].

In the example of FIG. 2, data is written, starting in position 001 on track X (more specifically, the sector at position 001 on track X) via position 002 up to position 003. Next, as shown by arrow A01, the head 12 is moved from track X to track X+1 and positioned in the target position on the track X+1. After settling time (a first settling time) $T_2$ [s] for seek and positioning has elapsed, subsequent data writing is performed, starting in position 101 on track X+1 via position 102 up to position 103. Then, as shown by arrow A12, after settling time (a second settling time) $T_2$ [s] for further seek and positioning has elapsed, subsequent data writing is performed, starting in position 201 on track X+2 close to position 203. As described above, in the example of FIG. 2, the disk 11 has an area in which data is recorded sequentially in one radial direction of the disk 11.

Next, an example of the relationship between write positions on tracks and logical addresses in sequential writing applied in the embodiment will be explained with reference to FIG. 3. FIG. 3 is a schematic diagram to explain sequential writing in FIG. 2 in association with write positions on tracks and logical addresses. In FIG. 3, the vertical axis indicates the radial direction of the disk 11 and the direction in which the lower part of the vertical axis points (that is, downward arrow 31) shows a radial direction toward the inner edge of the disk 11. In FIG. 3, the horizontal axis indicates a circumferential direction of the disk 11. The right direction of the horizontal axis (that is, the direction in which arrow 32 points) shows the rotational direction (angular direction) of the disk 11. In FIG. 3, concentric tracks are represented linearly (or schematically) for convenience of drawing.

In the example of FIG. 3, each of the tracks includes the same number of sectors. In the example, for convenience of drawing, suppose the number of sectors per track is 0F (0x0F) in the hexadecimal representation and 16 (0d16) in the decimal representation. As in a magnetic disk drive to which constant density recording (CDR) has been applied, tracks on the outer edge side of the disk 11 (more specifically, tracks in a zone on the outer edge side) may include more sectors than tracks on the inner edge side (more specifically, tracks in a zone on the inner edge side).

In FIG. 3, a logical address LBA allocated to each sector on the tracks is represented as the sector number of the sector. In the sectors corresponding to positions 001 to 003, 101 to 103, 201 and 203 in FIG. 2 respectively, the positions are represented in parentheses. Suppose the data amount per sector (per logical address LBA) is L bits.

As seen from the explanation with reference to FIG. 2, sequential writing is performed on tracks X, X+1, and X+2 as follows. First, data writing is performed, beginning in the sector at LBA:00 (position 001) on track X via the sector at LBA:02 (position 002) up to the sector at LBA:0F (position 003). Next, as shown by arrow A01, after a first settling time $T_2$ [s] has elapsed, subsequent data writing is performed, beginning in the sector at LBA:10 (position 101) on track X+1 via the sector at LBA:12 (position 102) up to the sector at LBA:1F (position 103). Then, as shown by arrow A12, after another second settling time $T_2$ [s] has elapsed, subsequent data writing is performed, beginning in the sector at LBA:20 (position 201) on track X+2 forward close to the sector at LBA:2F (position 203) in the end. In the example of FIG. 3, the data amount $I_1$ per track is 16 sectors, that is, 16L bits. The data amount $I_2$ corresponding to each of the first and second settling times $T_2$ [s] is three sectors, that is, 3L bits.

Figure 4:
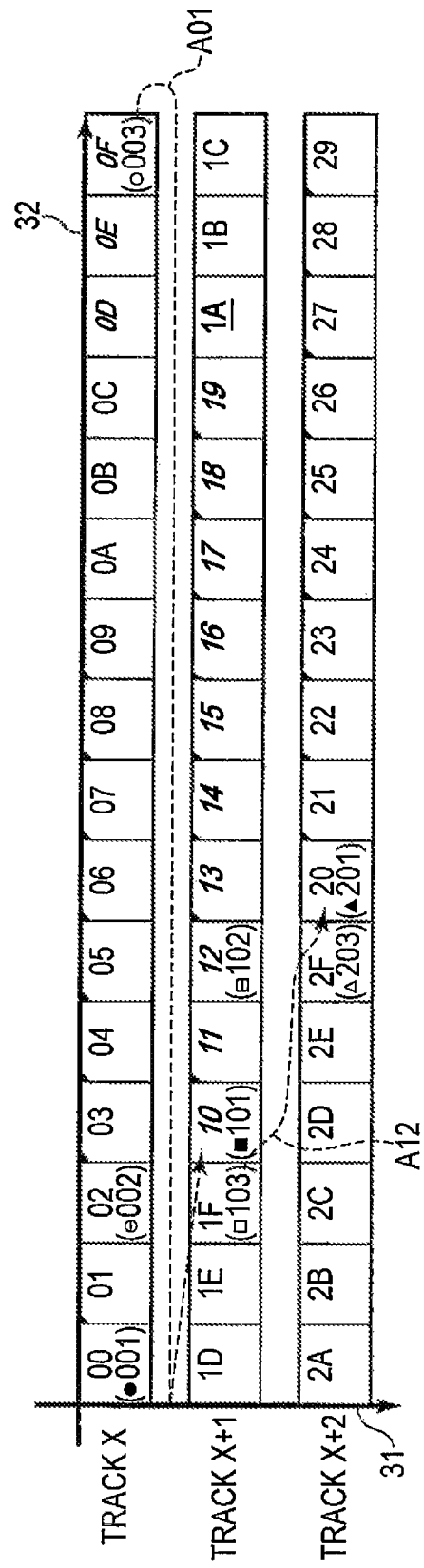
FIG. 4 is a schematic diagram to explain the definition of the buffering of already-written data corresponding to one revolution of a disk in sequential writing applied in the embodiment.

FIG. 4 is a schematic diagram to explain the definition of the buffering of already-written data corresponding to one revolution of a disk in sequential writing applied in the embodiment. FIG. 4 shows the state of buffering when data is written to the sector at underlined LBA:1A in association with write positions on tracks and logical addresses LBAs. Specifically, data written to the sectors at the italicized LBAs in FIG. 4 (that is, 13 sectors) is temporarily stored as data A in the buffer 17 of FIG. 1 for only $T_1$ [s].

These 13 sectors are composed of the three sectors from LBA:0D to LBA:0F (position 003 in FIG. 2) on track X and the ten sectors from LBA:10 (position 101 in FIG. 2) to LBA:19 (that is, immediately in front of LBA:1A currently being written to) on track X+1. The time required from when the writing of data at LBA:0D is started until the writing of data at LBA:19 has been completed coincides with time $T_1$ [s] required for the disk 11 to rotate one revolution. Time $T_1$ [s] includes the first settling time $T_2$ [s] shown by arrow A01.

In the embodiment, data temporarily stored in the buffer 17 is classified into two types of data, data A and data B. The type of data A is called type A (a second type) and the type of data B is called type B (a first type). As described above, data A is data written sequentially during a period of time $T_1$ [s] (that is, a period corresponding to one revolution of the disk 11) earlier than data currently being written. Data A is stored in the buffer 17 for time $T_1$ [s]. In contrast, data B is stored in the buffer 17 in a period of time $2 T_1$ [s]. That is, data B is stored in the buffer 17 twice as long as data A. The reason for this and the definition of data B will be described later.

Next, rewriting based on data A (already-written data) stored in the buffer 17 will be explained with reference to FIGS. 5 and 6. Rewriting based on data A (data of the second type) is performed when the head 12 writes data over a part of a track adjacent to the target track because of an unexpected temporary displacement of the head 12.

Figure 5:
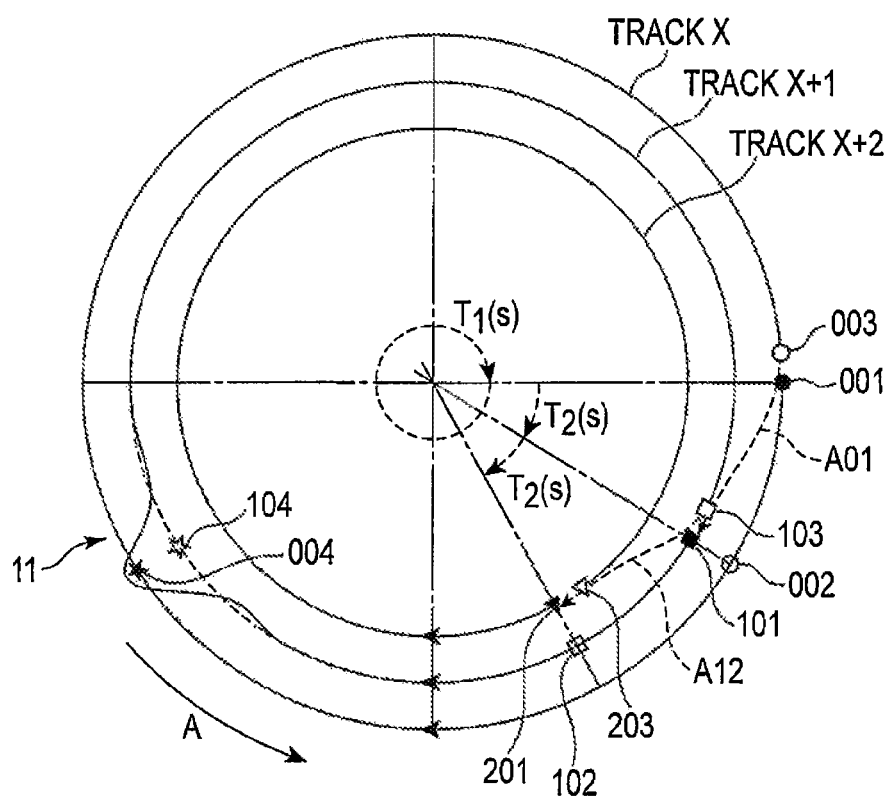
FIG. 5 is a diagram to explain an exemplary case where overwriting that enables rewriting based on data of a second type takes place in the embodiment.

FIG. 5 is a diagram to explain an exemplary case (hereinafter, referred to as a first case) where overwriting that enables rewriting based on data A takes place in the embodiment. In FIG. 5, sequential writing is performed as follows. First, data is written, starting in position 001 on track X via position 002 up to position 003. Next, as shown by arrow A01, after the first settling time $T_2$ [s] has elapsed, subsequent data writing is performed, starting in position 101 on track X+1 via position 102. Up to this point, the processes are the same as in the example of FIG. 2.

Here, suppose the displacement of the head 12 has occurred as shown in FIG. 5 because of an unexpected disturbance in the course of writing data in position 104 on track X+1. In the example of FIG. 5, because of the displacement, overwriting occurs in position 004 on track X adjacent to track X+1.

Figure 6:
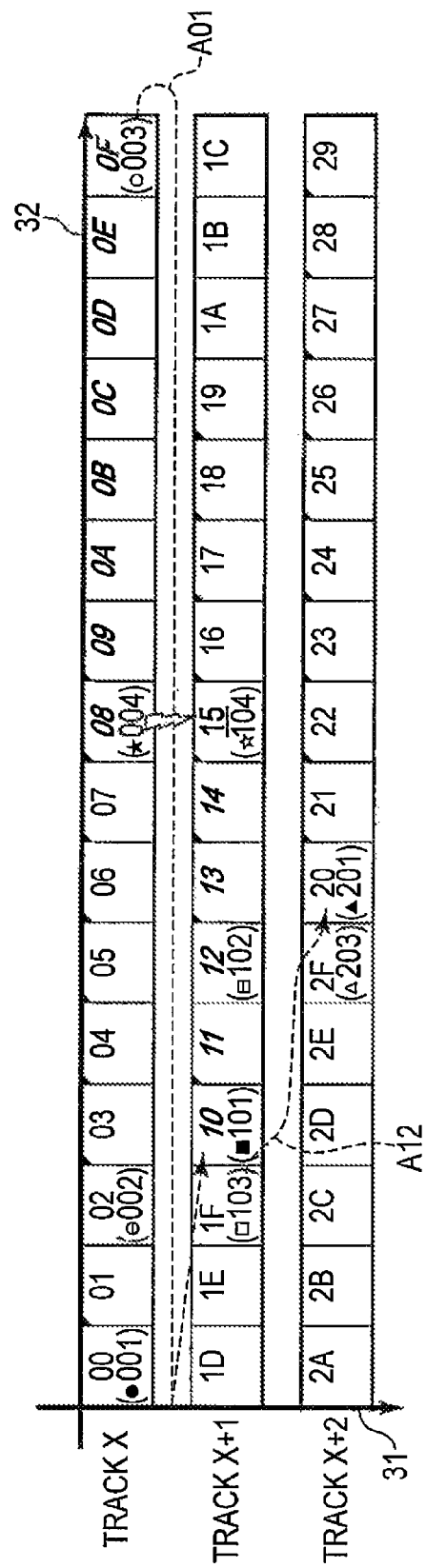
FIG. 6 is a schematic diagram to explain sequential writing in the case of FIG. 5 in association with write positions on tracks and logical addresses.

FIG. 6 is a schematic diagram to explain sequential writing in the first case of FIG. 5 in association with write positions on tracks and logical addresses LBAs. In FIG. 6, position 104 on track X+1 where the displacement of the head has occurred corresponds to the sector at underlined LBA:15. Position 004 on track X overwritten with data to be written to the sector at LBA:15 (position 104) corresponds to the sector at LBA:08. FIG. 6 also shows the state of buffering when data is being written to the sector at LBA:15 (position 104). Specifically, data written in 13 sectors ranging from italicized LBA:08 to LBA:14 in FIG. 6 has been stored as data A in the buffer 17 of FIG. 1.

Therefore, data (already-written data) in sector at overwritten LBA:08 (position 004) is in the buffer 17. In this case, the already-written data in the buffer 17 can be rewritten to the sector at LBA:08 (position 004). That is, the sector at LBA:08 (position 004) overwritten with data to be written to the sector at LBA:15 (position 104) can be restored to the state immediately before the occurrence of the overwriting.

Therefore, the HDC 22 uses the following procedure. First, the HDC 22 rewrites already-written data to the sector at LBA:08 stored in the buffer 17 in position 004 on track X. Thereafter, the HDC 22 resumes writing data at LBA:15 and afterward, starting in position 104 on track X+1.

Figure 7:
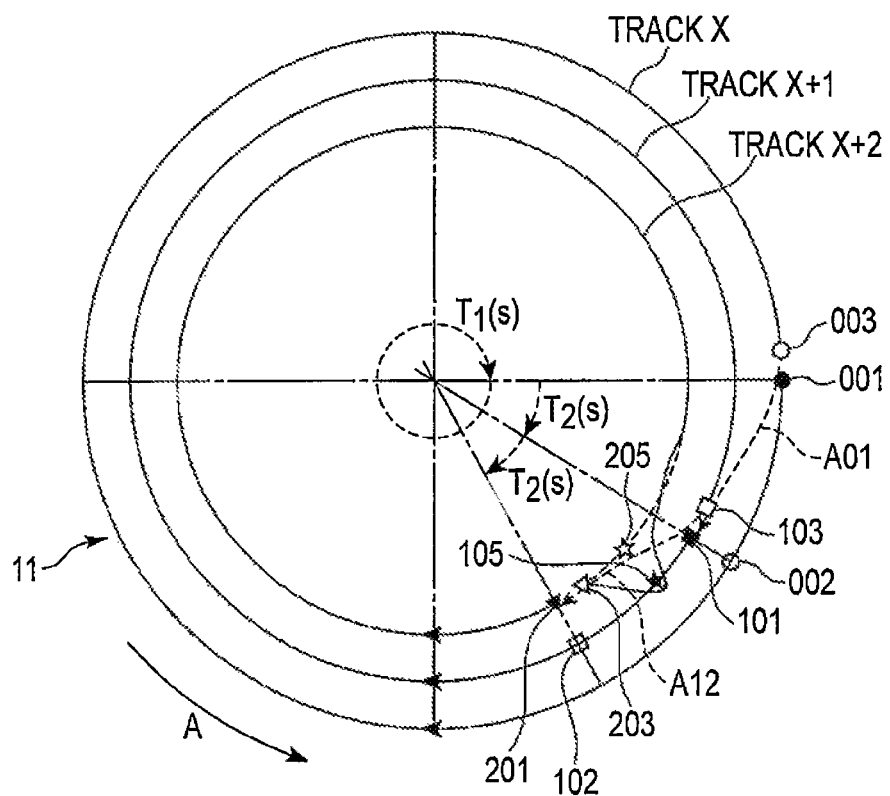
FIG. 7 is a diagram to explain an exemplary case where overwriting that disables rewriting based on data of a second type takes place in the embodiment.

Next, a case where overwriting where rewriting based on data A cannot be done has occurred (hereinafter, referred to as a second case) will be explained with reference to FIGS. 7 and 8. FIG. 7 is a diagram to explain the second case. In FIG. 7, sequential writing is performed as follows. As in the example of FIG. 2, first, data is written, starting in position 001 on track X up to position 103 on track X+1. Then, as in the example of FIG. 2, after the second settling time $T_2$ [s] has elapsed as shown by arrow A12, subsequent data writing is performed, beginning in position 201 on track X+2. Thereafter, unlike the example of FIG. 2, suppose the displacement of the head 12 has occurred as shown in FIG. 7 because of an unexpected disturbance in the course of writing data in position 205 immediately in front of position 203 on track X+2. In the example of FIG. 7, because of the displacement, overwriting has occurred in position 105 on track X+1 adjacent to track X+2.

Figure 8:
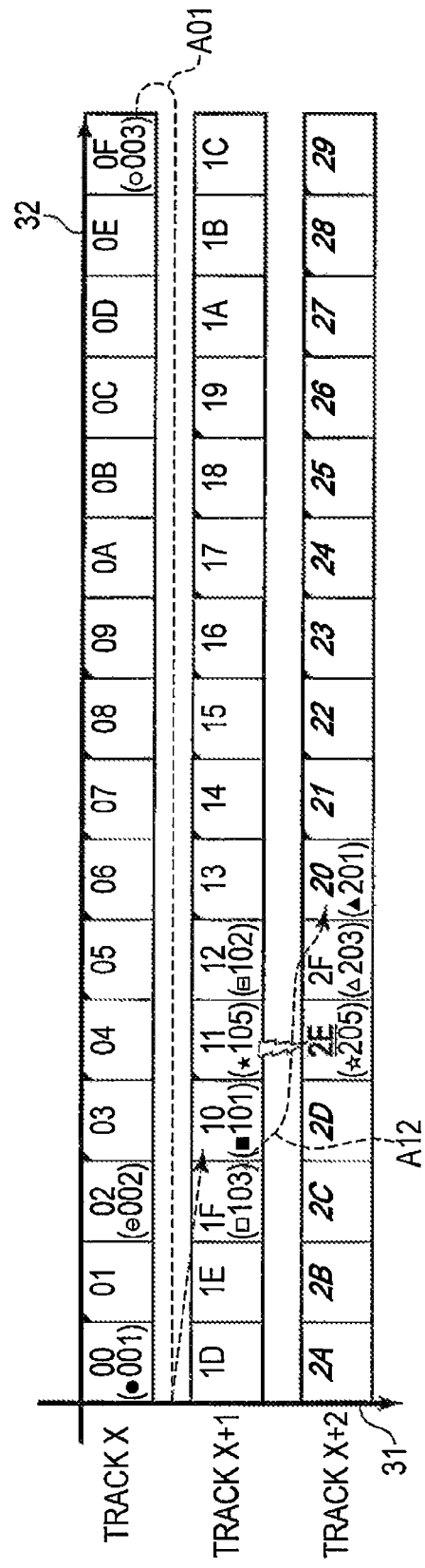
FIG. 8 is a schematic diagram to explain sequential writing in the case of FIG. 7 in association with write positions on tracks and logical addresses.

FIG. 8 is a schematic diagram to explain sequential writing in the second case of FIG. 7 in association with write positions on tracks and logical addresses LBAs. In FIG. 8, position 205 on track X+2 where displacement has occurred corresponds to underlined LBA:2E. Position 105 on track X+1 overwritten with data to be written to the sector at LBA:2E (position 205) corresponds to LBA:11. FIG. 8 also shows the state of buffering when data is being written to the sector at LBA:2E (position 205). Specifically, data written to 14 sectors ranging from italicized LBA:20 to LBA:2D in FIG. 8 has been stored as data A in the buffer 17 of FIG. 1.

However, data in the sector at overwritten LBA:11 (position 105) is not in the buffer 17. The reason is that the data in the sector at LBA:11 (position 105) is data written at time $t_2$ which is time $T_3$ [s] longer than time $T_1$ [s] before the present time to and therefore does not meet the definition of data A. Time $T_3$ [s] is, for example, twice as long as time $T_1$ [s], that is, $2 T_1$ [s].

Data in the buffer 17 will be explained in detail. First, suppose $t_1$ is a point in time which is time $T_1$ [s] before time $t_0$. In this case, data in 14 sectors ranging from LBA:20 to LBA:2D is data written in the period $(t_0-t_1)$ between time $t_1$ and time $t_0$, that is, in time $T_1$ [s] required for the disk 11 to rotate one revolution. Therefore, the data in the range of LBA:20 to LBA:2D meets the definition of data A and therefore is in the buffer 17.

In contrast, data in the sector at LBA:11 (position 105) is not data written in time $T_1$ [s] taken for one revolution between time $t_1$ and time $t_0$. More specifically, data in the sector at LBA:11 (position 105) is data written immediately after data was written to the sector at LBA:10 (position 101) through seek and positioning shown by arrow A01. That is, data in the sector at LBA:11 (position 105) is data written at time $t_2$ which is time $2 T_1$ [s] ($2 T_1=T_3$) before time $t_0$. Therefore, data in the sector at LBA:11 (position 105) is not data A whose period (or retention time) when it is stored in the buffer 17 is $T_1$ [s] and has already been purged from the buffer 17. Accordingly, it is impossible to rewrite data to the sector at LBA:11 (position 105). As described above, when only data A is temporarily stored in the buffer 17, this might permit overwriting that disables rewriting to take place.

Therefore, even if overwriting that makes it impossible to rewrite data A takes place, the data retention time in the buffer 17 is changed from $T_1$ [s] to, for example, $2 T_1$ [s] (that is, $T_3$ [s]) to make the rewriting possible. However, changing the retention times of all the data items to $2 T_1$ [s] leads to an increase in the capacity of the buffer 17. Therefore, data temporarily stored in the buffer 17 is classified into two types, data A and data B. In the embodiment, the retention time of data A is $T_1$ [s], whereas the retention time of data B is $2 T_1$ [s].

Figures 9A, 9B:
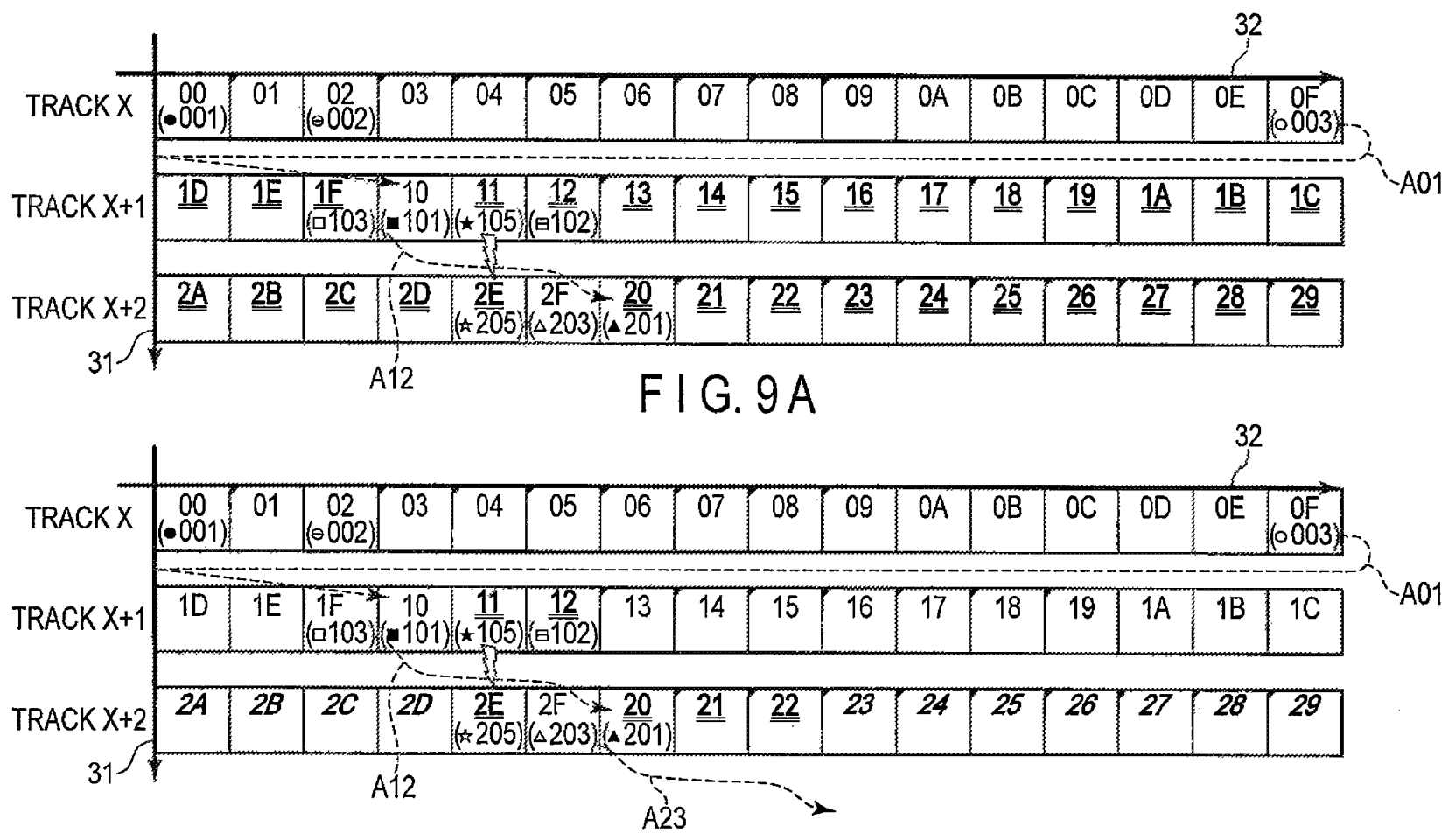

Hereinafter, data B (and data A) will be explained with reference to FIGS. 9A and 9B. FIG. 9A is a schematic diagram to explain the definition of data B applied in the embodiment. FIG. 9B is a schematic diagram to explain the definition of data A and data B applied in the embodiment. Like FIG. 8, FIG. 9A also shows the state of buffering at time $t_0$ when data is written to the sector at underlined LBA:2E (position 205). Suppose data written to 29 sectors ranging from double underlined LBA:11 to LBA:2D in FIG. 9A has been stored in the buffer 17.

Here, suppose data B is defined as already-written data whose retention time is $2 T_1$ [s]. LBA:11 indicates a position (sector) in which data was written at time $t_2$ time $2 T_1$ [s] before the present time $t_0$. LBA:2D indicates a position where data was written immediately before data is currently being written. Therefore, data written to 29 sectors ranging from LBA:11 to LBA:2D corresponds to data B (more specifically, a tentative definition of data B) and is currently stored in the buffer 17. That is, the data written to the sector at LBA:11 (position 105) is included in data B. In this case, even if data is written over the sector at adjacent LBA:11 (position 105) as a result of the sector at LBA:2E (position 205) currently being written to, corresponding already-written data in the buffer 17 can be rewritten to the sector at LBA:11. The rewriting enables the sector at LBA:11 to be restored to the state before the overwriting occurred.

However, to store the data written to 29 sectors ranging from LBA:11 to LBA:2D (that is, data corresponding to two revolutions of the disk 12) according to the definition of data B, the buffer 17 must have a capacity corresponding to the data amount equal to almost to two tracks. For example, the data amount of two tracks on the outer edge side of the today's magnetic disk drive is about 2.5 megabytes (MB) in the case of a 2.5-inch drive and about 5 MB in the case of a 3.5-inch drive. The capacity of a memory used as the buffer 17, such as a dynamic RAM (DRAM), is about 8 to 64 MB. For this reason, the capacity required for the buffer 17 is never negligible. Therefore, the consideration and implementation of the way to make proper the amount of data to be stored in the buffer 17 are very valuable and offer great benefits.

In FIG. 9A, writing data to 13 sectors ranging from LBA:20 to LBA:2C on track X+2 might lead to overwriting data to 13 sectors ranging from LBA:13 to LBA:1F of adjacent track X+1. However, at the present time $t_0$ (that is, time $t_0$ in the course of writing data to the sector at LBA:2E), the writing of data to 13 sectors ranging from LBA:20 to LBA:2C has already been completed. Therefore, there is no possibility that data in 13 sectors ranging from LBA:13 to LBA:1F will be newly overwritten. From this, it is seen that there is no need to hold data written to 13 sectors ranging from LBA:13 to LBA:1F in the buffer 17 at least at the present time $t_0$.

Data in the sectors on track X+1 required to be held in the buffer 17 at least at the present time $t_0$ includes data in the sector at LBA:11 where overwriting might take place by the writing of data to the sector at LBA:2E currently being performed and data in the sector at LBA:12 where overwriting might take place by the writing of data to the sector at LBA:2F to be performed next. Therefore, data written to all the sectors on track X+1 need not necessarily be held as data B for time $2 T_1$ [s]. This will be described in further detail.

First, suppose the condition (hereinafter, referred to as a second condition) that the range (a first range) of direction angle through which the head 12 moved during the period when data was written to the disk 11 departs from the range (a second range) of direction angle through which the head 12 moves during the settling time for seek and positioning occurred in time $T_1$ [s] after the writing (that is, in the time taken for the disk 11 to rotate one revolution). Already-written data to a sector that satisfies the second condition has only to be held as data A for time $T_1$ [s]. The movement of the head 12 means that the position in the circumferential direction on the disk 11 in which the head 12 lies changes from Pa to Pb as a result of the rotation of the disk 11, that is, the head 12 moves relatively to the disk 11. "Direction angle through which the head 12 moved" means the angle in the circumferential direction on the disk 11 through which the head 12 moved, more specifically, the angle formed by segments OPa and PPb connecting the center O of the disk 11 and Pa and Pb respectively.

Here, a case where data is being written to the sector at LBA:2E on track X+2 is taken as an example. In this case, of the sectors on adjacent track X+1, 13 sectors in the range of LBA:13 to LBA:1F depart from the range of direction angle through which the head 12 moves during the second settling time for the latest seek and positioning shown by arrow A12. That is, 13 the sectors in the range of LBA:13 to LBA:1F satisfy the second condition. Therefore, the data written to the 13 sectors in the range of LBA:13 to LBA:1F may be buffered as data A, not data B. In the state where such buffering has been performed, even if data in a corresponding second sector in the range of LBA:13 to LBA:1F has been overwritten in writing data to a first sector in the range of LBA:20 to LBA:2C on track X+2, the second sector can be restored to the state immediately before the overwriting took place. If an average data retention time for each sector in the buffer 17 decreases as a result of the buffering, the capacity of the buffer 17 (buffer capacity) can be decreased.

Next, the technique for decreasing the buffer capacity will be explained in further detail with reference to FIG. 9B. Like FIG. 9A, FIG. 9B also shows the state of buffering at time $t_0$ when data is written to the sector at underlined LBA:2E (position 205) on track X+2. In FIG. 9B, data written to the 11 sectors in the range of italicized LBA:23 to LBA:2D on track X+2 is "already-written data" whose retention period is $T_1$ [s] and is data A written to the sectors in the range that satisfies the second condition.

Further in FIG. 9B, data written to the two sectors in the range of double underlined LBA:11 to LBA:12 on track X+1 adjacent to track X+2 is "already-written data" whose retention period is $2T_1$ [s] and is data B written to the sectors in the range that satisfies the first condition. Similarly, data written to the three sectors in the range of double underlined LBA:20 to LBA:22 on track X+2 is "already-written data" whose retention period is $2T_1$ [s] and is data B written to the sectors in the range that satisfies the first condition. That is, the first condition is newly added to the definition of data B.

The first condition is that a part or all of the range (a first range) of direction angle through which the head 12 moved when data was written to the disk 11 is included in the range (a second range) of direction angle through which the head 12 moves in the settling time for seek and positioning that takes place in time $T_1$ [s] after the writing (that is, the time taken for the disk 11 to rotate one revolution). For this reason, the range of LBA:11 to LBA:12 corresponds to the range of direction angle through which the head 12 moved in a second settling time shown by arrow A12 in FIG. 9B and therefore satisfies the first condition. The second settling time is the time required to move the head 12 from track X+1 to track X+2 and position the head 12 at a target position on the track X+2. Similarly, the range of LBA:20 to LBA:22 corresponds to the range of direction angle through which the head 12 moved in a third settling time shown by arrow A23 in FIG. 9B and therefore satisfies the first condition.

Suppose, in a state where data A and data B explained with reference to FIG. 9B has been stored in the buffer 17, data in the sector at LBA:11 (position 105) has been overwritten because of an unexpected displacement of the head 12 in the course of writing data to the sector at LBA:2E (position 205). At this time, data written to the sector at LBA:11 is in the buffer 17. Therefore, the already-written data in the buffer 17 can be rewritten to the sector at LBA:11, enabling the sector at LBA:11 to be restored to the state immediately before the overwriting took place. In this case, while the amount of data corresponding to 29 sectors had to be held in the example of FIG. 9A, data corresponding to 16 sectors has only to be held, enabling the capacity of the buffer 17 to be reduced and the buffer 17 to be used efficiently.

Figure 10A:
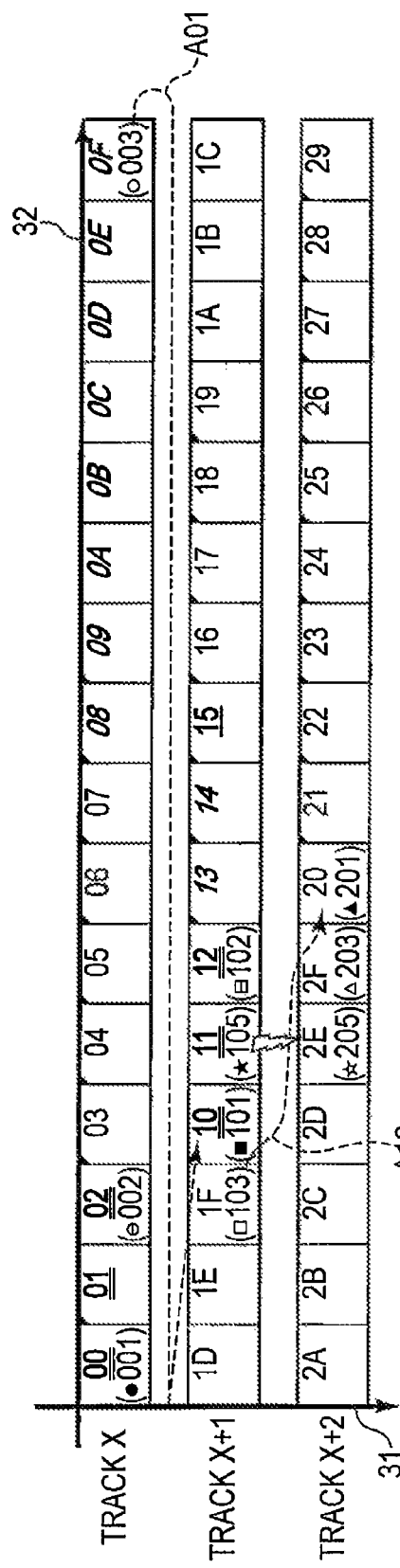
FIG. 10A is a schematic diagram to explain the data amount of data of the first type and that of data of the second type applied in the embodiment.
Figure 10B:
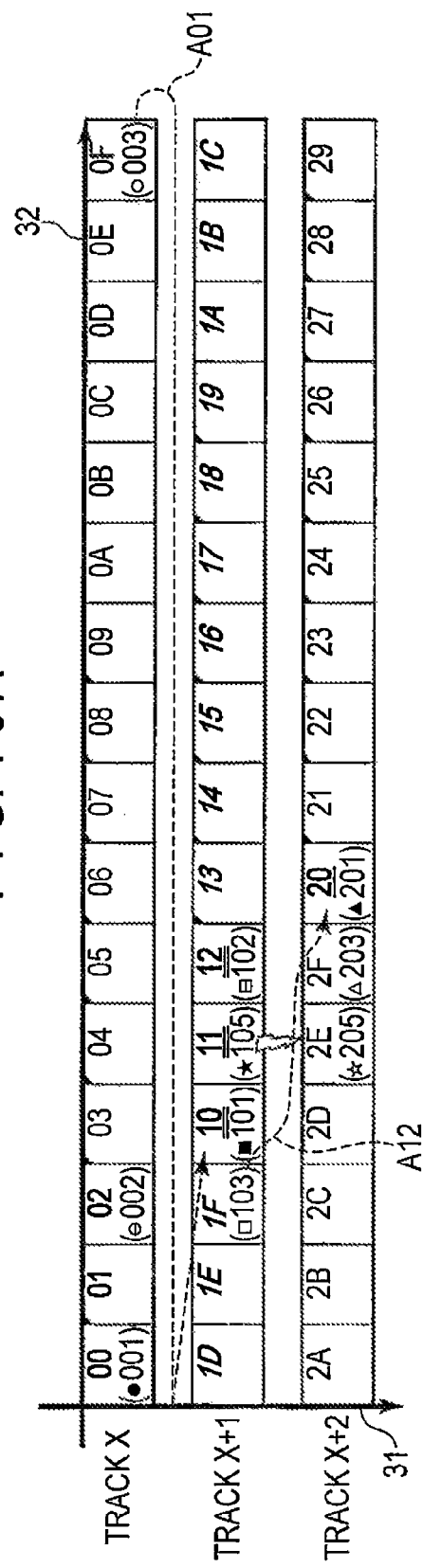
FIG. 10B is a schematic diagram to explain the data amount of data of the first type and that of data of the second type applied in the embodiment.

Here, the data amount of data A and that of data B will be explained with reference to FIGS. 10A and 10B in addition to FIG. 9B. FIGS. 10A and 10B are schematic diagrams to explain the data amount of data A and that of data B applied in the embodiment, respectively. First, a sector to which data is being written in FIG. 10A is an underlined sector at LBA:15 on track X+1. When data is being written to the sector at LBA:15, data A is data written to the 10 sectors in the range of italicized LBA:08 to LBA:0F on track X and in the range of italicized LBA:13 to LBA:14 on track X+1. Since the data amount per sector is L bits, the data amount of data A is 10L bits. Data B is data written to the six sectors in the range of double underlined LBA:00 to LBA:02 on track X and in the range of double underlined LBA:10 to LBA:12 on track X+1. The data amount of data B is 6L bits. As described above, the data amount $I_1$ per track is 16L bits and the data amount $I_2$ corresponding to settling time $T_2$ [s] is 3L bits. Accordingly, the data amount of data A is "$I_1 - 2 \times I_2$" and the data amount of data B is "$2 \times I_2$."

Next, a sector to which data is being written in FIG. 10B is an underlined sector at LBA:20 (position 201) on track X+2. When data is being written to the sector at LBA:20, data A is data written to the 13 sectors in the range of italicized LBA:13 to LBA:1F on track X+1. The data amount of data A is 13L bits. Data B is data written to the three sectors in the range of double underlined LBA:10 to LBA:12 on track X+1. The data amount of data B is 3L bits. In this case, unlike the example of FIG. 10A, the data amount of data A is "$I_1 - I_2$" and the data amount of data B is "$I_2$."

As described above, a sector to which data is being written in FIG. 9B is the sector at LBA:2E (position 205) on track X+2. When data is being written to the sector at LBA:2E, data A is data written to the 11 sectors in the range of LBA:23 to LBA:2D. The data amount of data A is 11L bits. Data B is data written to the five sectors in the range of LBA:11 to LBA:12 and in the range of LBA:20 to LBA:22. The data amount of data B is 5L bits. In this case, the data amount of data A is "$I_1 - I_2 + 1$" and the data amount of data B is "$2 \times I_2 - 1$."

As described above, the data amount of data A and that of data B applied in the embodiment vary from hour to hour. However, at all points of time, the data amount of data A is equal to or less than $(I_1 - I_2)$ bits and the data amount of data B is equal to or less than $2 \times I_2$ bits. In addition, at all points of time, the sum of the data amount of data A and that of data B is $I_1$ bits.

Next, an exemplary procedure for sequential writing applied in the embodiment will be explained with reference to a flowchart in FIG. 11. Suppose data is written sequentially to sectors on the disk 11 corresponding to the logical addresses ranging from xS (LBA:xS) to xE (LBA:xE). Here, xS indicates a write start data address and xE indicates a write end data address. Suppose sequential writing is performed in the direction in which the track number increases as, for example, in the example of FIG. 2.

First, the HDC 22 initially sets pointer x (LBA:x) indicating a write data address to xS (block 1100). Next, the HDC 22 writes data $D_x$ to the sector at LBA:x on the disk 11 via the R/W channel 21 by the head 12 (block 1101). Suppose the sector at LBA:x is on track X and adjacent to the sector at LBA:y in the radial direction of the disk 11.

After having executed block 1101, the HDC 22 determines whether data in the sector at adjacent LBA:y has been overwritten in the course of writing data to the sector at LBA:x (more specifically, there is a possibility that overwriting has taken place) (block 1102). In the embodiment, when an unexpected displacement of the head 12 toward the sector at adjacent LBA:y exceeding a reference value has been detected by the detector 230 of the servo controller 23, the MDC 22 determines that data in the sector at LBA:y has been overwritten.

Here, suppose data in the adjacent sector has not been overwritten (No in block 1102). In this case, the determination module 222 of the HDC 22 determines whether the sector at LBA:x corresponds to the settling time required to move the head 12 from track X to track X+1 and position the head at a target position on track X+1 (block 1103). "The sector at LBA:x corresponds to the settling time" means that "the sector at LBA:x" satisfies the first condition.

If the result of block 1103 is "No," the buffer controller 221 of the HDC 22 determines whether the buffer 17A is filled (block 1104). If the result of block 1104 is "Yes," the buffer controller 221 of the HDC 22 purges the oldest sector data in the buffer 17A (block 1105) and proceeds to block 1106. In contrast, if the result of block 1104 is "No," the buffer controller 221 of the HDC 22 skips block 1105 and proceeds to block 1106. In block 1106, the buffer controller 221 stacks data $D_x$ (that is, data $D_x$ written to the sector at LBA:x) in the buffer 17A. This means that data $D_x$ is stacked as data A (that is, in association with type A) in the buffer 17.

On the other hand, if the result of block 1103 is "Yes," the buffer controller 221 determines whether the buffer 17B is filled (block 1107). If the result of block 1107 is "Yes," the buffer controller 221 purges the oldest sector data in the buffer 17B and proceeds to block 1109. In contrast, if the result of block 1107 is "No," the buffer controller 221 skips block 1108 and proceeds to block 1109. In block 1109, the buffer controller 221 stacks data $D_x$ in the buffer 17B. This means that data $D_x$ is stacked as data B (that is, in association with type B) in the buffer 17.

When having completed block 1106 or 1109, the HDC 22 increments pointer x by one (block 1110). Then, HDC 22 determines whether the incremented pointer x has exceeded xE (block 1111). If the result of block 1111 is "No," the HDC 22 returns to block 1101 and writes data $D_x$ to the sector at LBA:x (that is, the next sector) on the disk 11 indicated by the incremented pointer x. Hereinafter, the same process as described above is repeated until the incremented pointer x has exceeded xE (Yes in block 1111).

Suppose, in due time, data in the sector at adjacent LBA:y has been overwritten in the course of writing data to the sector at LBA:x (Yes in block 1102). In this case, the HDD 22 determines whether data $D_y$ written to the sector at LBA:y remains in the buffer 17 (that is, buffer 17A or 17B) (block 1112).

If data $D_y$ written to the sector at LBA:y remains in the buffer 17 (Yes in block 1112), the HDC 22 rewrites data $D_y$ in the buffer 17 to the sector at LBA:y (block 1113). Then, the HDC 22 returns to block 1101 and writes data $D_x$ to the sector at LBA:x again. In the embodiment, when the sector at LBA:y is a sector on track X−1, data $D_y$ remains in the buffer 17. In contrast, if data $D_y$ does not remain in the buffer 17 (No in block 1112), the HDC 22 informs the host of an error (block 1114) and terminates the sequential writing.

In the embodiment, to assure the retention periods of data A and data B varying in data amount from hour to hour in the buffers 17A and 17B respectively, the size (capacity) of each of the buffers 17A and 17B is set as follows. The size of the buffer 17A is set to $(I_1-I_2)$ bits, the maximum data amount of data A. The size of the buffer 17B is set to $2 \times I_2$ bits, the maximum data amount of data B. That is, in the embodiment, the buffer 17A and buffer 17B are allocated to independent memory spaces of a fixed size in the buffer 17 in which the maximum data amount of data A and that of data B can be stored.

Therefore, the size of the entire buffer 17 is $(I_1+I_2)$ bits. The size of the entire buffer 17 is $I_2$ bits (or a little) lower in space efficiency than $I_1$ bits, the sum of the data amount of data A and that of data B. However, since its implementation is relatively simple as compared with a modification described later, the buffer 17 is sufficiently practical in a magnetic disk drive designed to have sufficiently small $I_2$ (that is, a magnetic disk drive designed to perform seek and positioning at high speed).

As described above, with the embodiment, in sequential writing typified by shingled writing, rewriting based on already-written data in the buffer can be implemented reliably to restore data in a sector overwritten because of an unexpected displacement of the head 12 to the state immediately before the occurrence of the overwriting. Specifically, the embodiment enables data to be rewritten to the sectors in the range through which the head 12 moved in the settling time for seek and positioning and further the data amount of already-written data to be held in the buffer 17 to be reduced to about half of the minimum required data amount (the data amount corresponding to two tracks) in the conventional art.

<Modification of Sequential Writing>

Figure 12:
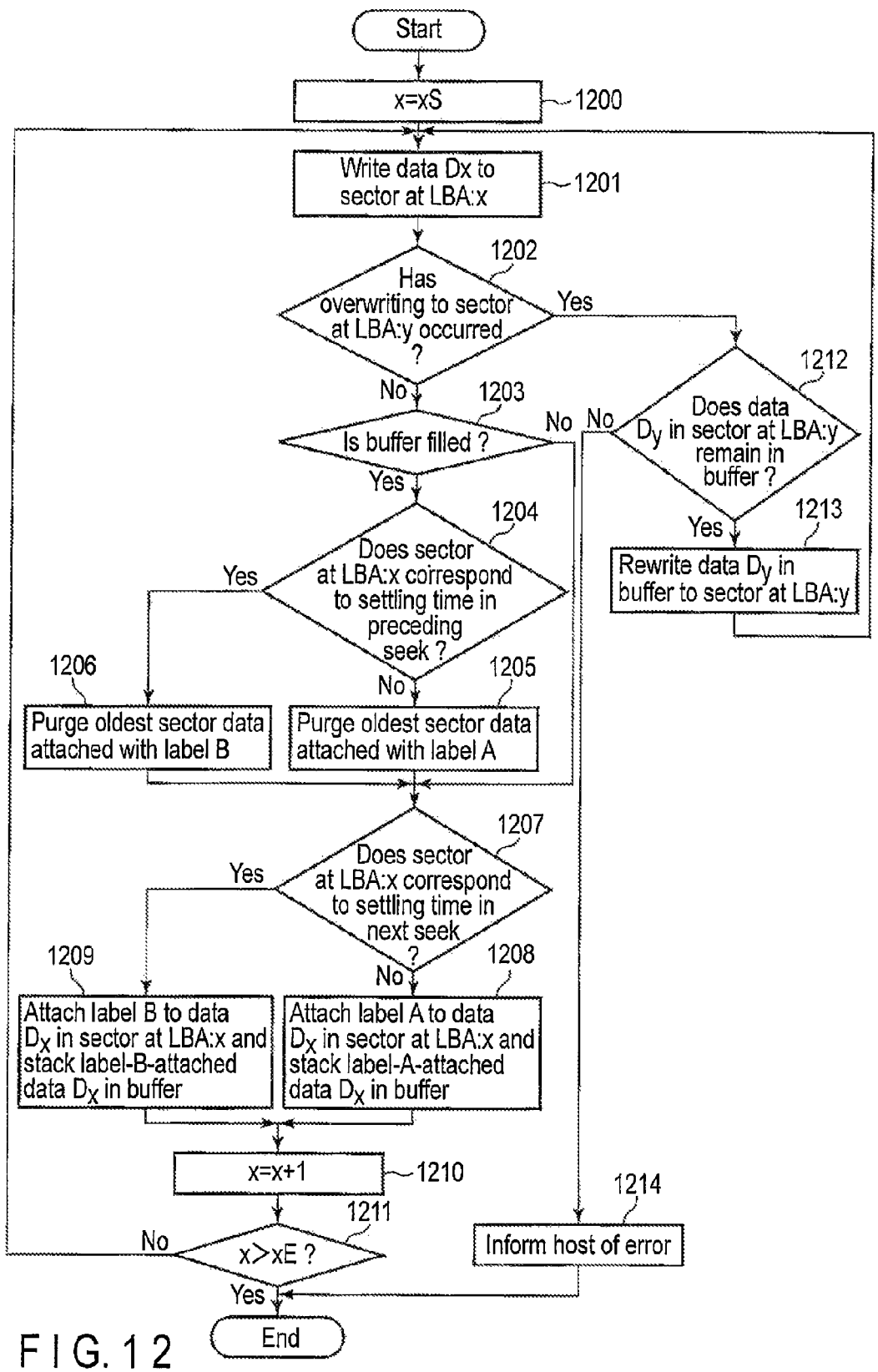
FIG. 12 is a flowchart to explain an exemplary procedure for sequential writing applied in a modification of the embodiment.

Next, an exemplary procedure for sequential writing applied in a modification of the embodiment will be explained with reference to a flowchart in FIG. 12, focusing on the difference from the flowchart of FIG. 11. The modification of sequential writing is characterized by reducing the size of the entire buffer 17 more than in the embodiment. Unlike in the embodiment, the memory space of the buffer 17 has not been divided into two memory spaces. Therefore, in the memory space of the buffer 17, neither the buffer 17A nor 17B exists. That is, in the buffer 17, data A and data B are present as a mixture.

As described above, the retention time of data A is $T_1$ [s] and the retention time of data B is $2 T_1$ [s]. In the modification of sequential writing, a label (label A or label B) that indicates whether the sector data is either data A or data B is attached to each sector data item stored in the buffer 17. The size of the buffer 17 is $I_1$ bits, which is $I_2$ bits less than that in the embodiment. That is, the size of the buffer 17 is equal to the sum of the data amount of data A and that of data B, being $I_1$ bits.

First, the HDC 22 executes blocks 1200 to 1202 corresponding to blocks 1100 to 1102 in FIG. 11. In block 1202, the HDC 22 determines whether data in the sector at adjacent LBA:y in the radial direction of the disk 11 has been overwritten in the course of writing data to the sector at LBA:x. If the result of block 1202 is "No," the HDC 22 determines whether the buffer 17 is filled (block 1203).

If the buffer 17 is filled (Yes in block 1203), the HDC 22 determines that it is necessary to purge sector data from the buffer 17 to store data $D_x$ in the sector at LBA:x in the buffer 17. Therefore, to determine which one of data A and data B should be purged as sector data, the determination module 222 of the HDC 22 determines whether the sector at LBA:x corresponds to the settling time for seek and positioning required for the head 12 to move from track X−1 to track X the previous time (block 1204).

If the result of block 1204 is "No," the buffer controller 221 of the HDC 22 purges the oldest sector data with label A attached from the buffer 17 (block 1205). In contrast, if the result of block 1204 is "Yes," the buffer controller 221 of the HDC 22 purges the oldest sector data with label B attached from the buffer 17 (block 1206).

After having completed block 1205 or 1206, the HDC 22 proceeds to block 1207. If the buffer 17 is not filled (No in block 1203), the HDC 22 skips blocks 1204 to 1206 and proceeds to block 1207. As in block 1103, in block 1207, the determination module 222 of the HDC 22 determines whether the sector at LBA:x corresponds to the settling time for the next seek and positioning.

If the result of block 1207 is "No," the HDC 22 proceeds to block 1208. In block 1208, the buffer controller 221 of the HDC 22 attaches label A to data $D_x$ (that is, data $D_x$ written to the sector at LBA:x) and stacks data $D_x$ with label A attached in the buffer 17. In contrast, if the result of block 1207 is "Yes," the HDC 22 proceeds to block 1209. In block 1209, the buffer controller 221 of the HDC 22 attaches label B to data $D_x$ and stacks data $D_x$ with label B attached in the buffer 17.

When having completed block 1208 or 1209, the HDC 22 increments pointer x by one (block 1210) as in block 1110. If the incremented pointer x has not exceeded xE (No in block 1211), the HDC 22 returns to block 1201. Hereinafter, the same processes as described above are repeated until the incremented pointer x has exceeded xE (Yes in block 1211).

Suppose, in due time, data in the sector at adjacent LBA:y has been overwritten in the course of writing data to the sector at LBA:x (Yes in block 1202). In this case, the HDD 22 determines whether data $D_y$ written to the sector at LBA:y remains in the buffer 17 (block 1212).

If data $D_y$ written to the sector at LBA:y remains in the buffer 17 (Yes in block 1212), the HDC 22 rewrites data $D_y$ in the buffer 17 to the sector at LBA:y (block 1213). Then, the HDC 22 returns to block 1201 and writes data $D_x$ to the sector at LBA:x again. In contrast, if data $D_y$ does not remain in the buffer 17 (No in block 1212), the HDC 22 informs the host of an error (block 1214) and terminates the sequential writing.

As described above, instead of dividing the memory space of the buffer 17 and allocating data A and data B to buffers 17A and 17B respectively, the modification of sequential writing manages the memory space with labels A and B suitably, thereby allocating data A and data B to the memory space. Therefore, the size of the buffer 17 can be suppressed to ideal $I_1$. With the modification of sequential writing, a magnetic disk drive designed to have large $I_2$ (that is, a magnetic disk drive designed to perform seek and positioning at low speed) can realize a larger decrease in the buffer capacity than in the embodiment. Unlike in the embodiment, in the modification, dynamic management based on labels in the memory space of the buffer 17 is needed.

Next, an exemplary procedure for sequential reading applied in the embodiment will be explained with reference to a flowchart in FIG. 13. Here, suppose data is read sequentially from sectors on the disk 11 corresponding to the range of LBA:xS to LBA:xE. Unlike in the aforementioned sequential writing, in sequential reading, xS is a read start data address and xE is a read end data address. Suppose sequential reading is performed in the direction in which the track number increases as in sequential writing.

Data temporarily stored in the buffer 17 in sequential reading is classified into two types, data A and data B, as in sequential writing. The definition of data A and data B is the same as in sequential writing. In the aforementioned definition of data A and data B in sequential writing, "write" should be replaced with "read" if necessary.

The HDC 22 initially sets pointer x (LBA:x) indicating a read data address to xS (block 1300). Next, the HDC 22 starts the operation of causing the head 12 to read data $D_x$ from the sector at LBA:x on the disk 11 via the R/W channel 21.

First, the HDC 22 determines whether data $D_y$ at LBA:y adjacent to the sector at LBA:x in the radial direction of the disk 11 (that is, data $D_y$ read from the sector at LBA:y) is in the buffer 17 (block 1301). If the result of block 1301 is "Yes," the HDC 22 reads data $D_x$ from the sector at LBA:x using data $D_y$ in buffer 17 (that is, data read from LBA:y) (block 1302).

That is, the HDC 22 reads data $D_x'$ by the head 12 via the R/W channel 21 and cancels inter-track interference components included in the read data $D_x'$ based on data $D_y$ in the buffer 17. Specifically, first, the HDC 22 obtains the displacement amount of the head 12 from the detector 203 of the servo controller 23. Next, the HDC 22 subtracts data $D_y$ multiplied by coefficient a corresponding (e.g., proportional) to the displacement amount (i.e., $\alpha D_y$) from the read data $D_x'$, thereby obtaining read data $D_x$ from which the inter-track interference components have been cancelled. That is, the HDC 22 obtains the inter-track-interference-cancelled data as data $D_x$ read from the sector at LBA:x. Such a read operation is called an inter-track interference-canceling read (ITI read) or a crosstalk-canceling read.

In contrast, if the result of block 1301 is "No," the HDC 22 reads data by the head 12 via the R/W channel 21 and obtains the read data as data $D_x$ read from the sector at LBA:x (block 1303). After having executed block 1302 or 1303, the HDC 22 proceeds to block 1304. In block 1304, the HDC 22 determines whether data $D_x$ has been read from the sector at LBA:x properly in block 1302 or 1303. The operations up to this point are the same as in the conventional art.

If data $D_x$ has been read properly (Yes in block 1304), the determination module 222 of the HDC 22 determines whether the sector at LBA:x corresponds to the settling time for the next seek and positioning (block 1305) as in block 1103. If the result of block 1305 is "No," the buffer controller 221 of the HDC 22 determines whether the buffer 17A is filled (block 1306). If the result of block 1306 is "Yes," the buffer controller 221 purges the oldest sector data in the buffer 17A (block 1307) and proceeds to block 1308. In contrast, if the result of block 1306 is "No," the buffer controller 221 skips block 1307 and proceeds to block 1308. In block 1308, the buffer controller 221 stacks data $D_x$ (that is, data $D_x$ read properly from LBA:x) in the buffer 17A.

On the other hand, if the result of block 1305 is "Yes," the buffer controller 221 determines whether the buffer 17B is filled (block 1309). If the result of block 1309 is "Yes," the buffer controller 221 purges the oldest sector data in the buffer 17B (block 1310) and proceeds to block 1311. In contrast, if the result of block 1309 is "No," the buffer controller 221 skips block 1310 and proceeds to block 1311. In block 1311, the buffer controller 221 stacks data $D_x$ in the buffer 17B.

When having completed block 1308 or 1311, the HDC 22 increments pointer x by one (block 1312). Then, the HDC 22 determines whether the incremented pointer x has exceeded xE (block 1313). If the result of block 1313 is "No," the HDC 22 returns to block 1301. Hereinafter, the same processes as described above are repeated until the incremented pointer x has exceeded xE (Yes in block 1313). If data Dx has not been read properly from the sector at LBA:x in block 1302 or 1303 (No in block 1304), the HDC 22 informs the host of an error (block 1314) and terminates the sequential reading.

As described above, with the embodiment, the techniques applied in the sequential writing can be applied to the securing of a buffer area for temporarily storing already-read data in sequential reading and to the reduction of the capacity of the buffer area. Therefore, in sequential reading typified by shingled reading, reading based on already-read data in the buffer can be implemented reliably to cancel inter-track interference due to unexpected displacement of the head 12. Specifically, the embodiment enables data in the sectors in the range through which the head 12 moved in the settling time for seek and positioning to be read and further the data amount of already-read data to be held in the buffer 17 to be reduced to about half of the minimum required data amount (the data amount corresponding to two tracks) in the conventional art.

<Modification of Sequential Reading>

Figure 14:
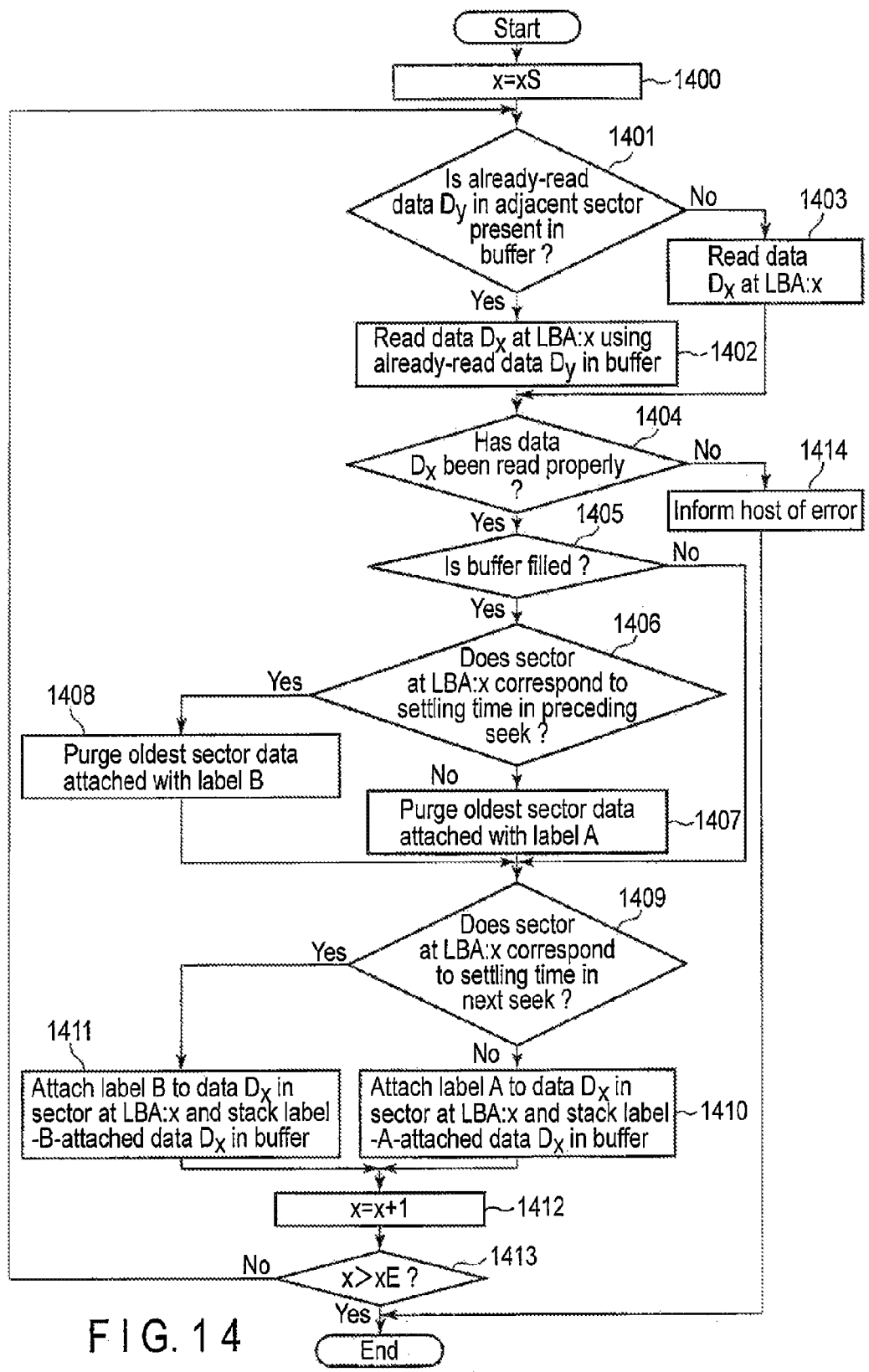
FIG. 14 is a flowchart to explain an exemplary procedure for sequential reading applied in a modification of the embodiment.

Next, an exemplary procedure for sequential reading applied in a modification of the embodiment will be explained with reference to a flowchart in FIG. 14, focusing on the difference from the flowchart of FIG. 13. The modification of sequential reading is characterized by reducing the size of the entire buffer 17 even more than in the embodiment by applying the same buffer management as in the aforementioned modification of sequential writing.

First, the HDC 22 executes blocks 1400 to 1404 corresponding to blocks 1300 to 1304 in FIG. 13. In block 1404, the HDC 22 determines whether data $D_x$ has been read properly from the sector at LBA:x in bloCk 1402 or 1403. If the result of block 1404 is "Yes," the HDC 22 determines whether the buffer 17 is filled (block 1405).

If the buffer 17 is filled (Yes in block 1405), as in block 1207, the determination module 222 of the HDC 22 determines whether the sector at LBA:x corresponds to the settling time for seek and positioning required for the head 12 to move from track X−1 to track X the previous time (block 1406). If the result of block 1406 is "No," the buffer controller 221 of the HDC 22 purges the oldest sector data with label A attached from the buffer 17 (block 1407). In contrast, if the result of block 1406 is "Yes," the buffer controller 221 of the HDC 22 purges the oldest sector data with label B attached from the buffer 17 (block 1408).

After having completed block 1407 or 1408, the HDC 22 proceeds to block 1409. If the buffer 17 is not filled (No in block 1405), the HDC 22 skips blocks 1406 to 1408 and proceeds to block 1409. As in block 1207, in block 1409, the determination module 222 of the HDC 22 determines whether the sector at LBA:x corresponds to the settling time for the next seek and positioning.

If the result of block 1409 is "No," the HDC 22 proceeds to block 1410. In block 1410, the buffer controller 221 of the HDC 22 attaches label A to data $D_x$ (that is, data $D_x$ read from the sector at LBA:x) and stacks data $D_x$ with label A attached in the buffer 17. In contrast, if the result of block 1409 is "Yes," the HDC 22 proceeds to block 1411. In block 1411, the buffer controller 221 of the HDC 22 attaches label B to data $D_x$ and stacks data $D_x$ with label B attached in the buffer 17.

When having completed block 1410 or 1411, the HDC 22 increments pointer x by one (block 1412) as in block 1312. If the incremented pointer x has not exceeded xE (No in block 1413), the HDC 22 returns to block 1401. Hereinafter, the same processes as described above are repeated until the incremented pointer x has exceeded xE (Yes in block 1413). If data $D_x$ has not been read properly from the sector at LBA:x in block 1402 or 1403 (No in block 1404), the HDC 22 informs the host of an error (block 1414) and terminates the sequential reading.

As described above, even with the modification of sequential reading, the techniques applied in the modification of sequential writing can be applied to the securing of a buffer area for temporarily storing already-read data and to the reduction of the capacity of the buffer area. Therefore, in sequential reading typified by shingled reading, data reading based on already-read data in the buffer can be realized reliably to cancel inter-track interference due to an unexpected displacement of the head 12. Specifically, the modification of sequential reading enables data in the sectors in the range through which the head 12 moved in the settling time for seek and positioning to be read and further the data amount of already-read data to be held in the buffer 17 to be reduced to about half of the minimum required data amount (the data amount corresponding to two tracks) in the conventional art.

According to at least one of the embodiments described above, there are provided a magnetic disk drive capable of reducing the storage capacity of a buffer, while realizing rewriting resulting from an unexpected displacement of the head in sequential writing or canceling inter-track interference in sequential reading and a data buffering method in the magnetic disk drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of temporarily storing, in a buffer, data written sequentially on a disk or data read sequentially from the disk in a magnetic disk drive, wherein $I_1$ bits of data is written concentrically on the disk by a head in time $T_1$ per revolution or $I_1$ bits of data written concentrically on the disk is read by the head in the time $T_1$ per revolution, and settling time $T_2$ shorter than the time $T_1$ is needed from when the head is moved to an adjacent track until writing or reading by the head is started, the method comprising:

determining whether first data or second data is of a first type or a second type in data type based on whether a first range of direction angle of a first area on a first track on the disk corresponds to a second range of direction angle through which the head moves in the settling time $T_2$ during a period from when the first data is written in the first area in the sequential writing or from when the second data is read from the first area in the sequential reading until the disk has rotated one revolution;

storing the first data or the second data in association with the determined data type in the buffer; and controlling the buffer so that the data of the first type stored in the buffer may be held in the buffer for a length of time twice as long as the time $T_1$ and the data of the second type stored in the buffer may be held in the buffer for the time $T_1$.

2. The method of claim 1, wherein:

the first data or the second data is determined to be the first type in data type when at least a part of the first range is included in the second range; and the first data or the second data is determined to be the second type in data type when the first range departs from the second range.

3. The method of claim 2, wherein a first data amount of data of the first type stored in the buffer is equal to or less than $2\times I_2$ bits and a second data amount of data of the second type stored in the buffer is equal to or less than $(I_1-I_2)$ bits if the amount of data written or read in a time equal to the settling time $T_2$ is $I_2$ bits.

4. The method of claim 3, wherein the buffer comprises:
a first buffer configured to store data of the first type, the first buffer having a size of the $2\times I_2$ bits, and
a second buffer configured to store data of the second type, the second buffer having a size of the $(I_1-I_2)$ bits.

5. The method of claim 2, wherein the sum of a first data amount of data of the first type stored in the buffer and a second data amount of data of the second type stored in the buffer is the $I_1$ bits.

6. The method of claim 5, wherein:
the buffer has a size of the $I_1$ bits; and
the method further comprises attaching a label indicating the determined data type to the first data or the second data stored in the buffer.

7. The method of claim 1, further comprising:
detecting the displacement of the head toward a second track in the course of writing the first data in the first area or of reading the second data from the first area, the second track being a track adjacent to the first track on which data was written earlier than data was written on the first track in the sequential writing or from which data was read earlier than data was read from the first track in the sequential reading; and
rewriting third data written in a second area and stored in the buffer to the second area on the second track corresponding to the first area where data was overwritten due to the displacement of the head or cancelling inter-track interference components included in the read second data based on fourth data read from the second area and stored in the buffer.

8. A magnetic disk drive in which $I_1$ bits of data are written concentrically on a disk by a head in time $T_1$ per revolution or $I_1$ bits of data written concentrically on the disk are read by the head in the time $T_1$ per revolution and in which settling time $T_2$ shorter than the time $T_1$ is needed from when the head is moved to an adjacent track until writing or reading by the head is started, the magnetic disk drive comprising:
a buffer configured to temporarily store data written sequentially on the disk or data read sequentially from the disk;
a determination module configured to determine whether first data or second data is of a first type or a second type in data type based on whether a first range of direction angle of a first area on a first track on the disk corresponds to a second range of direction angle through which the head moves in the settling time $T_2$ during a period from when the first data is written in the first area in the sequential writing or from when the second data is read from the first area in the sequential reading until the disk has rotated one revolution; and
a buffer controller configured to store the first data or the second data in association with the determined data type in the buffer and to control the buffer so that the data of the first type stored in the buffer may be held in the buffer for a length of time twice as long as the time $T_1$ and the data of the second type stored in the buffer may be held in the buffer for the time $T_1$.

9. The magnetic disk drive of claim 8, wherein the determination module is configured to determine the first data or the second data to be the first type in data type when at least a part of the first range is included in the second range and to determine the first data or the second data to be the second type in data type when the first range departs from the second range.

10. The magnetic disk drive of claim 9, wherein a first data amount of data of the first type stored in the buffer is equal to or less than $2\times I_2$ bits and a second data amount of data of the second type stored in the buffer is equal to or less than $(I_1-I_2)$ bits if the amount of data written or read in a time equal to the settling time $T_2$ is $I_2$ bits.

11. The magnetic disk drive of claim 10, wherein the buffer comprises:
a first buffer configured to store data of the first type, the first buffer having a size of the $2\times I_2$ bits, and
a second buffer configured to store data of the second type, the second buffer having a size of the $(I_1-I_2)$ bits.

12. The magnetic disk drive of claim 9, wherein the sum of a first data amount of data of the first type stored in the buffer and a second data amount of data of the second type stored in the buffer is the $I_1$ bits.

13. The magnetic disk drive of claim 12, wherein:
the buffer has a size of the $I_1$ bits; and
the buffer controller is further configured to attach a label indicating the determined data type to the first data or the second data stored in the buffer.

14. The magnetic disk drive of claim 8, further comprising:
a detector configured to detect the displacement of the head toward a second track in the course of writing the first data in the first area or of reading the second data from the first area, the second track being a track adjacent to the first track on which data was written earlier than data was written on the first track in the sequential writing or from which data was read earlier than data was read from the first track in the sequential reading; and
a disk controller configured to rewrite third data written in a second area and stored in the buffer to the second area on the second track corresponding to the first area where data was overwritten due to the displacement of the head or to cancel inter-track interference components included in the read second data based on fourth data read from the second area and stored in the buffer.

* * * * *